US010615625B2

United States Patent
Li et al.

(10) Patent No.: US 10,615,625 B2
(45) Date of Patent: Apr. 7, 2020

(54) SYSTEM AND METHOD FOR WIRELESS CHARGING

(71) Applicant: Beijing Xiaomi Mobile Software Co., Ltd., Haidian District, Beijing (CN)

(72) Inventors: Zhijie Li, Beijing (CN); Wei Sun, Beijing (CN); Dan Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 324 days.

(21) Appl. No.: 15/443,775

(22) Filed: Feb. 27, 2017

(65) Prior Publication Data
US 2017/0250561 A1 Aug. 31, 2017

(30) Foreign Application Priority Data
Feb. 29, 2016 (CN) .......................... 2016 1 0112902

(51) Int. Cl.
*H02J 50/90* (2016.01)
*H02J 7/02* (2016.01)
(Continued)

(52) U.S. Cl.
CPC .............. *H02J 7/025* (2013.01); *H02J 50/10* (2016.02); *H02J 50/20* (2016.02); *H02J 50/40* (2016.02);
(Continued)

(58) Field of Classification Search
USPC ................................................. 320/108, 104
See application file for complete search history.

(56) References Cited

U.S. PATENT DOCUMENTS 6,967,462 B1   11/2005   Landis
7,893,564 B2 *  2/2011   Bennett ................. H02J 17/00
                                              307/104
(Continued)

FOREIGN PATENT DOCUMENTS

CN   102792552 A   11/2012
CN   102840859 A   12/2012
(Continued)

OTHER PUBLICATIONS

International Search Report (including English translation) and Written Opinion issued in corresponding International Application No. PCT/CN2016/101932, dated Jan. 9, 2017, 14 pages.
(Continued)

*Primary Examiner* — Drew A Dunn
*Assistant Examiner* — Tessema Kebede
(74) *Attorney, Agent, or Firm* — Arch & Lake LLP

(57) ABSTRACT

Systems and methods are provided for wireless charging. The system includes an intelligent management device and a wireless charging transmitter. The intelligent management device is configured to: receive a wireless charging request from the mobile terminal; generate a wireless charging instruction according to the first location information of the mobile terminal and the charging location information of the wireless charging transmitter; and send the wireless charging instruction to the wireless charging transmitter. The wireless charging transmitter is configured to: receive the wireless charging instruction; determine a transmitting direction according to the direction information in the wireless charging instruction; and transmit a wireless energy wave in the transmitting direction.

17 Claims, 10 Drawing Sheets

(51) Int. Cl.
  *H02J 50/40* (2016.01)
  *H02J 50/60* (2016.01)
  *H02J 50/20* (2016.01)
  *H02J 50/10* (2016.01)
  *H04W 4/02* (2018.01)
  *H04W 4/80* (2018.01)
  *H04B 5/00* (2006.01)
  *H04W 84/12* (2009.01)

(52) U.S. Cl.
  CPC .............. *H02J 50/60* (2016.02); *H02J 50/90* (2016.02); *H04W 4/023* (2013.01); *H04B 5/0037* (2013.01); *H04W 4/80* (2018.02); *H04W 84/12* (2013.01)

(56) References Cited

U.S. PATENT DOCUMENTS

| | | | |
|---|---|---|---|
| 9,088,171 | B2 | 7/2015 | Won et al. |
| 9,912,379 | B2* | 3/2018 | Hyde ...................... H02J 17/00 |
| 2006/0238365 | A1 | 10/2006 | Vecchione et al. |
| 2011/0221391 | A1 | 9/2011 | Won et al. |
| 2012/0326660 | A1* | 12/2012 | Lu ........................... H02J 17/00 |
| | | | 320/108 |
| 2014/0217955 | A1 | 8/2014 | Lin et al. |
| 2015/0022008 | A1 | 1/2015 | Leabman et al. |
| 2015/0042266 | A1* | 2/2015 | Chen ..................... H02J 7/0004 |
| | | | 320/108 |
| 2015/0318897 | A1 | 11/2015 | Hyde et al. |
| 2016/0087486 | A1* | 3/2016 | Pogorelik ............... H02J 7/025 |
| | | | 320/108 |
| 2017/0110887 | A1* | 4/2017 | Bell ........................ H02J 5/005 |

FOREIGN PATENT DOCUMENTS

| | | |
|---|---|---|
| CN | 103944281 A | 7/2014 |
| CN | 104821631 A | 8/2015 |
| CN | 105099003 A | 11/2015 |
| CN | 105162179 A | 12/2015 |

OTHER PUBLICATIONS

Extended European Search Report issued in corresponding EP Application No. 17155013, dated Jul. 13, 2017, 8 pages.
First Office Action to Chinese Application No. 201610112902.3, dated Jun. 28, 2019 and English translation (20p).

* cited by examiner

SYSTEM AND METHOD FOR WIRELESS CHARGING

CROSS-REFERENCE TO RELATED APPLICATION

The present application is based on and claims the priority of Chinese patent application No. 201610112902.3, filed on Feb. 29, 2016, the entire content of which is incorporated herein by reference.

TECHNICAL FIELD

The present disclosure generally relates to a mobile terminal field, and more particularly relates to systems and methods for wireless charging.

BACKGROUND

With expanded use of mobile terminals, a wireless charging technology has become an important form of charging the mobile terminal. The wireless charging technology refers to a technology for charging the mobile terminal using an electromagnetic wave without any electric wire.

Currently, the mobile terminal needs to be placed on a charging cradle when the mobile terminal is charged using the wireless charging technology, in which coils are provided inside the charging cradle and the mobile terminal respectively. An electromagnetic field will be generated when the electric current in the charging cradle flows through coils, and an electric current will be generated inside the mobile terminal when the coils provided inside the mobile terminal gets close to the generated electromagnetic field, such that a wireless charging for the mobile terminal is performed using a conversion between the electric current and the electromagnetic field.

SUMMARY

In order to overcome the problems existing in the related art, the present disclosure provides a wireless charging system and method. The technical solution is as follows.

According to a first aspect of the present disclosure, a wireless charging system is provided. The system includes an intelligent management device and a wireless charging transmitter, in which the intelligent management device is stored with charging location information of the wireless charging transmitter. The intelligent management device is configured to: receive a wireless charging request from a mobile terminal, in which the wireless charging request includes first location information of the mobile terminal; generate a wireless charging instruction according to the first location information of the mobile terminal and the charging location information of the wireless charging transmitter, in which the wireless charging instruction includes direction information of the mobile terminal relative to the wireless charging transmitter; and send the wireless charging instruction to the wireless charging transmitter. The wireless charging transmitter is configured to: receive the wireless charging instruction; determine a transmitting direction according to the direction information in the wireless charging instruction; and transmit a wireless energy wave in the transmitting direction.

According to a second aspect of the present disclosure, a wireless charging method is provided. The method includes: receiving a wireless charging request from a mobile terminal by an intelligent management device, in which the wireless charging request includes first location information of the mobile terminal; generating a wireless charging instruction according to the first location information of the mobile terminal and second location information of the wireless charging transmitter by the intelligent management device, in which the intelligent management device is stored with the second location information of the wireless charging transmitter, and the wireless charging instruction includes direction information of the mobile terminal relative to the wireless charging transmitter; sending the wireless charging instruction to the wireless charging transmitter by the intelligent management device; transmitting a wireless energy wave in the transmitting direction by the wireless charging transmitter, in which the transmitting direction is determined according to the direction information in the wireless charging instruction.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1A:
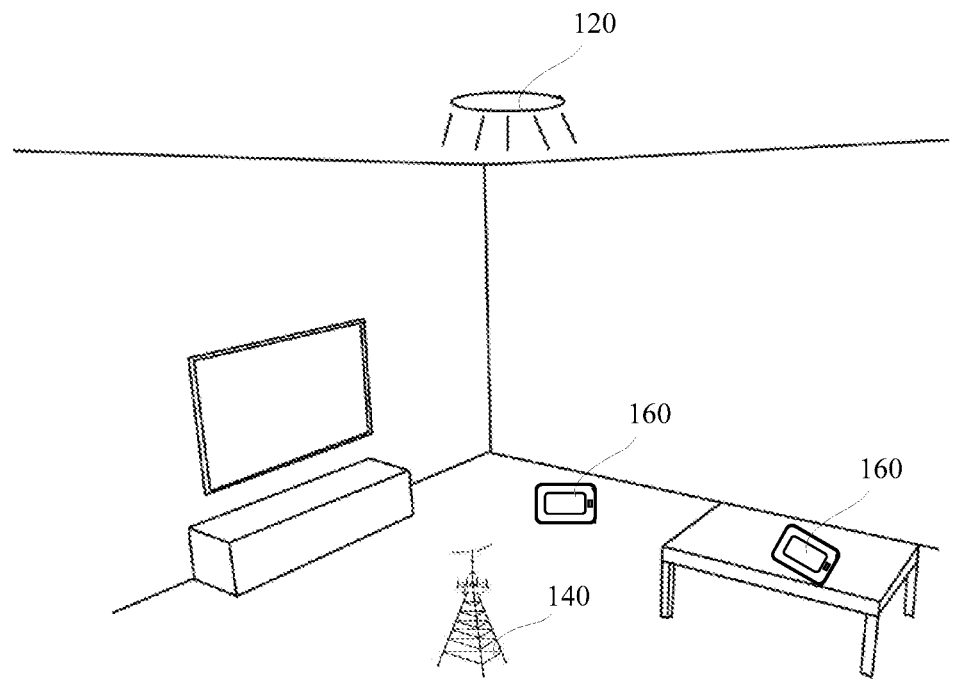
FIG. 1A is a schematic diagram showing a wireless charging system according to one or more exemplary embodiments.

FIG. 1A is a schematic diagram showing a wireless charging system according to one or more exemplary embodiments. As shown in FIG. 1A, the system may include an intelligent management device 120 and one wireless charging transmitter 140.

The wireless charging system is applied mainly in indoor environments (such as a shopping mall, a family etc.), and is configured mainly to perform a wireless charging for a mobile terminal in an indoor environment. As shown in FIG. 1A, as a possible example, the wireless charging system is applied in a family environment.

Alternatively or additionally, the wireless charging system may further include at least one mobile terminal 160. In this embodiment, the number of mobile terminals 160 is not defined specifically. In FIG. 1A, a case in which the wireless charging system has two mobile terminals 160 is explained just as an example.

The intelligent management device 120 may establish a connection with the mobile terminal 160 via a wireless network (e.g. wireless-fidelity (Wi-Fi) or Bluetooth etc.).

When the currently remaining electric quantity in the mobile terminal 160 is less than a predetermined threshold value, the mobile terminal 160 sends a wireless charging request to the intelligent management device 120 via the wireless network, in which the wireless charging request includes the first location information of the mobile terminal 160.

The intelligent management device 120 may include a processor, a communication circuitry controlled by the processor, and at least one sensor to detect or obtain location of other electronic device. The intelligent management device 120 may further include a non-transitory storage to store location information. The intelligent management device 120 may be configured to receive the wireless charging request from the mobile terminal 160. Besides receiving the wireless charging request from the mobile terminal 160, the intelligent management device 120 may also monitor the first location information of the mobile terminal 160. To ensure that the intelligent management device 120 may receive the wireless charging requests sent by all the mobile terminals 160 in the indoor environment, the intelligent management device 120 monitors the first location information of all the mobile terminals 160. As shown in FIG. 1A, as a possible example, the intelligent management device 120 is provided on an indoor ceiling.

Alternatively or additionally, intelligent management device 120 is stored with the second location information of the wireless charging transmitter 140. In this disclosure, the second location may also be referred as the charging location of the wireless charging transmitter.

The intelligent management device 120 generates a wireless charging instruction according to the first location information of the mobile terminal 160 and the second location information of the wireless charging transmitter 140, in which the wireless charging instruction includes the direction information of the mobile terminal 160 relative to the wireless charging transmitter 140.

The intelligent management device 120 may also be configured to send the wireless charging instruction to the wireless charging transmitter 140. In detail, the intelligent management device 120 may establish a connection with the wireless charging transmitter 140 via a wireless network or a wired network. After generating the wireless charging instruction, the intelligent management device 120 sends the wireless charging instruction to the wireless charging transmitter 140 via the wireless network or the wired network.

Alternatively or additionally, the wireless charging instruction further includes a charging mode, in which the charging mode includes sending a wireless energy wave continuously and sending a wireless energy wave periodically.

Alternatively or additionally, the wireless charging instruction may further include the currently remaining electric quantity.

Alternatively or additionally, as shown in FIG. 1A, the wireless charging transmitter 140 is placed in the middle of the indoor environment. In this embodiment, the position of the wireless charging transmitter is not defined specifically. The position of the wireless charging transmitter shown in FIG. 1A is explained merely as an example. Providing the wireless charging transmitter 140 in the middle position will help the wireless charging transmitter 140 transmit the wireless energy wave to respective mobile terminal 160 in the indoor environment according to the received wireless charging instruction.

The wireless charging transmitter 140 is configured to receive the wireless charging instruction sent by the intelligent management device 120, and the wireless charging transmitter 140 determines a transmitting direction according to the direction information in the wireless charging instruction.

Alternatively or additionally, the wireless energy wave may include an electromagnetic wave or a light beam wave etc.

After determining the transmitting direction, the wireless charging transmitter 140 transmits the wireless energy wave in the transmitting direction.

The mobile terminal 160 receives the wireless energy wave transmitted by the wireless charging transmitter 140 via a receiving antenna.

The mobile terminal 160 may be a smartphone, a tablet PC, a smart television, an eBook reader, a multimedia player, a laptop, a desk computer, or other mobile device having a chargeable battery.

Alternatively or additionally, the intelligent management device 120 may be integrated inside the wireless charging transmitter 140, or may be separate from the wireless charging transmitter 140 as an independent device. The intelligent management device 120 may also be integrated at least partially in a smart router.

Figure 1B:
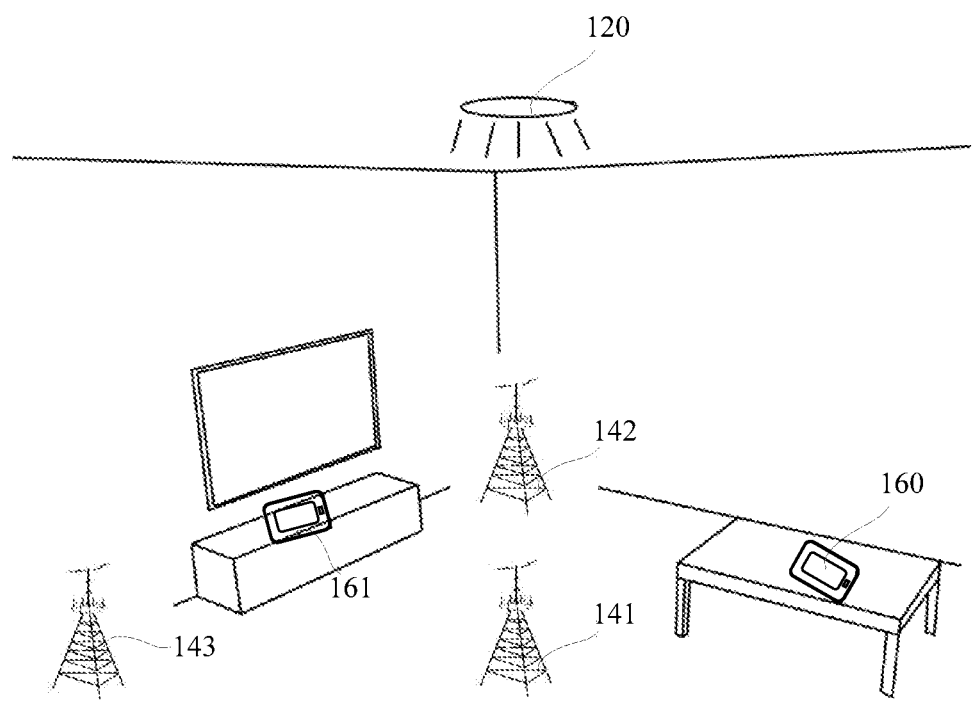
FIG. 1B is a schematic diagram showing another wireless charging system according to one or more exemplary embodiments.

FIG. 1B is a schematic diagram showing another wireless charging system according to one or more exemplary embodiments. As shown in FIG. 1B, the system may include an intelligent management device 120, a wireless charging transmitter 141, a wireless charging transmitter 142, and a wireless charging transmitter 143.

Unlike the system shown in FIG. 1A, the system includes at least two wireless charging transmitters. In this embodiment, the number of the wireless charging transmitters is not limited specifically. In FIG. 1B, a case in which the system includes three wireless charging transmitters is explained merely as an example. The intelligent management device 120 is stored with the second location information of the wireless charging transmitter 141, the wireless charging transmitter 142, and the wireless charging transmitter 143.

As shown in FIG. 1B, the wireless charging transmitter 141 is placed in the middle of the indoor environment; the wireless charging transmitter 142 is placed in a corner of the indoor environment, and the wireless charging transmitter 143 is placed in another corner of the indoor environment. In this embodiment, position of at least two wireless charging transmitters is not limited specifically, and the position of the wireless charging transmitters shown in FIG. 1B is merely explained as an example.

The intelligent management device 120 is configured to: identify its nearest wireless charging transmitter 141 according to the first location information of the mobile terminal 160; and generate a wireless charging instruction according to the first location information of the mobile terminal 160 and the second location information of the nearest wireless charging transmitter 141.

The intelligent management device 120 is further configured to send the wireless charging instruction to the nearest wireless charging transmitter 141.

Figure 2A:
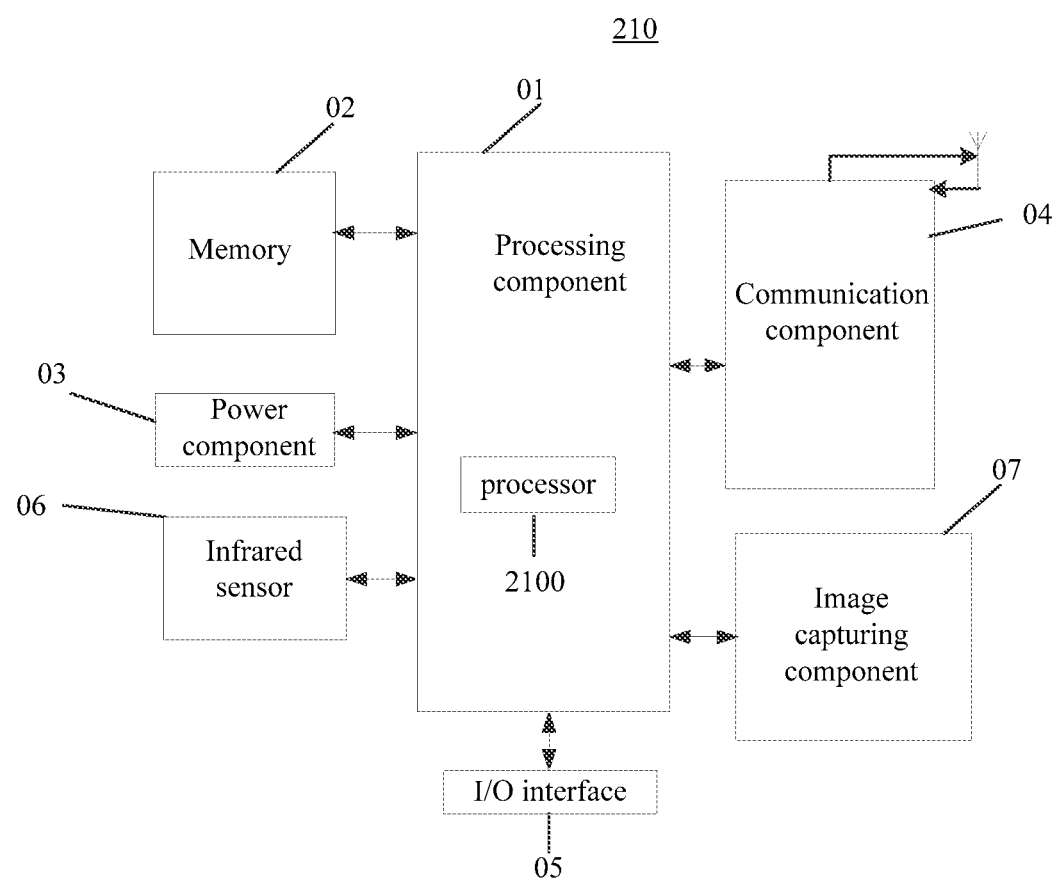
FIG. 2A is a block diagram showing an intelligent management device according to an exemplary embodiment.

FIG. 2A is a block diagram showing an intelligent management device 210 according to an exemplary embodiment. As shown in FIG. 2A, the intelligent management device 210 may include one or more of the following components: a processing component 01, a memory 02, a power component 03, a communication component 04, an input/output (I/O) interface 05, an infrared sensor 06, and an image capturing component 07.

The processing component 01 typically controls overall operations of the intelligent management device 210, such as the operations associated with display, data communications, camera operations, and recording operations. The processing component 01 may include one or more processors 2100 to execute instructions so as to perform all or part of the steps in the above described methods. Moreover, the processing component 01 may include one or more modules which facilitate the interaction between the processing component 01 and other components. For instance, the processing component 01 may include an image capturing module to facilitate the interaction between the image capturing component 07 and the processing component 01.

The memory 02 is configured to store various types of data to support the operation of the intelligent management device 210. Examples of such data include instructions for any applications or methods operated on the intelligent management device 210, messages, pictures, videos, etc. The memory 02 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 03 provides power to various components of the intelligent management device 210. The power component 03 may include a power management system, one or more power sources, and any other components associated with the generation, management, and distribution of power in the intelligent management device 210.

The communication component 04 is configured to facilitate wired or wireless communication between the intelligent management device 210 and other devices. The intelligent management device 210 can access a wireless network based on a communication standard, such as a WIFI network, a 2G network, or a 3G network, or a combination thereof. In one exemplary embodiment, the communication component 04 receives a broadcast signal or broadcast associated information from an external broadcast management system via a broadcast channel. In one exemplary embodiment, the communication component 04 further includes a near field communication (NFC) module to facilitate short-range communications. For example, the NFC module may be implemented based on a technology such as a radio frequency identification (RFID) technology, an infrared data association (IrDA) technology, an ultra-wideband (UWB) technology, a Bluetooth (BT) technology, and other technologies.

In the disclosure, the intelligent management device 210 may be implemented with one or more circuitries, which include one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The intelligent management device 210 may use the circuitries in combination with the other hardware or software components for performing the above described methods. Each module, sub-module, unit, or sub-unit disclosed above may be implemented at least partially using the one or more circuitries.

Alternatively or additionally, the intelligent management device 210 includes at least one communication component 04, such that the intelligent management device 210 has a communication capability. The intelligent management device 210 establishes a wireless network connection with the mobile terminal and the wireless charging transmitter respectively using the communication component 04. Alternatively or additionally, the intelligent management device 210 further includes a wired communication interface, in which the intelligent management device 210 establishes a wired network connection with the wireless charging transmitter using the wired communication interface.

The Input/output (I/O) interface 05 provides an interface between the processing component 01 and the peripheral interface module.

The infrared sensor 06 is configured to facilitate the intelligent management device 210 to monitor the mobile terminal and the wireless charging transmitter. The infrared sensor 06 makes the intelligent management device 210 have a capability of infrared detection. In one exemplary embodiment, as shown in FIG. 1A and FIG. 1B, the intelligent management device 210 monitors the obstacle information on the charging path between the mobile terminal and the wireless charging transmitter via the infrared sensor 06. When the obstacle information indicates that an obstacle exists on the charging path, the intelligent management device 210 sends a charging suspending instruction to the wireless charging transmitter.

The image capturing component 07 is configured to facilitate the intelligent management device 210 to monitor the first location information of the mobile terminal and the second location information of the wireless charging transmitter. The image capturing component 07 makes the intelligent management device 210 have an image capturing capability. For example, the image capturing component 07 is a camera or an omni-directional camera. In one exemplary embodiment, the intelligent management device 210 captures the image on the charging path between the mobile terminal and the wireless charging transmitter using the image capturing component 07, and acquires the obstacle information in the captured image. As shown in FIG. 1A and FIG. 1B, providing the intelligent management device 210 on the ceiling will be beneficial to capture images of all positions via the image capturing component 07. The intelligent management device 210 sends a charging suspending instruction to the wireless charging transmitter when the acquired obstacle information indicates that an obstacle exists on the charging path.

Alternatively or additionally, during wireless charging, the intelligent management device 210 captures the image of the position where the mobile terminal is using the image capturing component 07, and monitors whether the first location information of the mobile terminal changes according to the captured image of the mobile terminal.

Figure 2B:
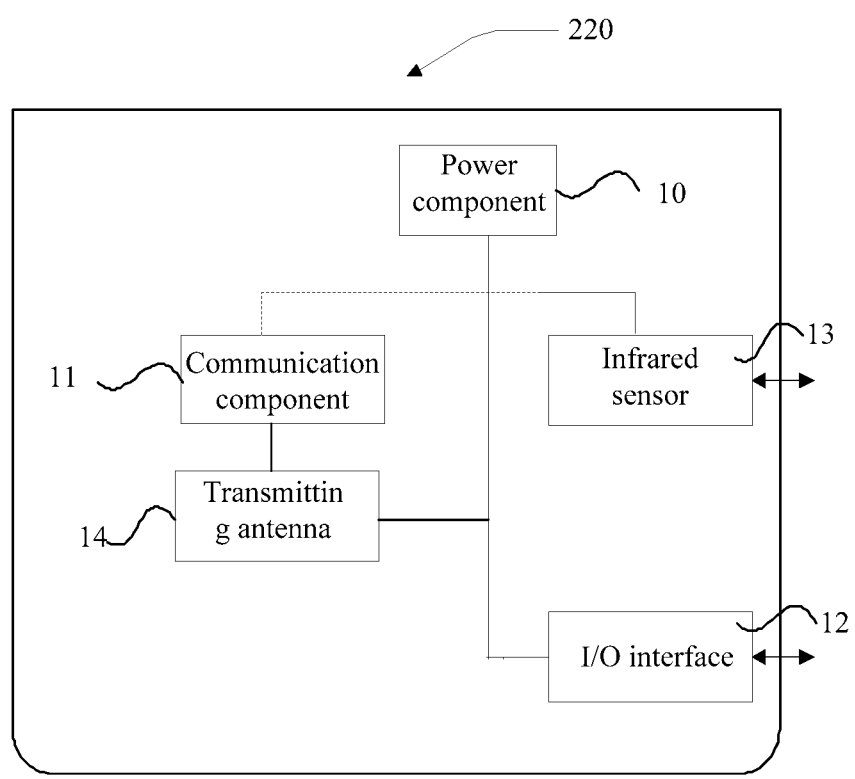
FIG. 2B is a block diagram showing a wireless charging transmitter according to an exemplary embodiment.

FIG. 2B is a block diagram showing a wireless charging transmitter 220 according to an exemplary embodiment. As shown in FIG. 2B, the wireless charging transmitter 220 may include one or more of the following components: a power component 10, a communication component 11, an input/output (I/O) interface 12, an infrared sensor 13, and a transmitting antenna 14.

The power component 10 provides power to various components of the wireless charging transmitter 220. The power component 10 may include a power management system, one or more power sources, and any other components associated with the generation, management, and distribution of power in the wireless charging transmitter 220.

The communication component 11 is configured to facilitate wired or wireless communication between the wireless charging transmitter 220 and the intelligent management devices. The wireless charging transmitter 220 can access a wireless network based on a communication standard, such as a WIFI network, a 2G network, or a 3G network, or a combination thereof. In one exemplary embodiment, the communication component 11 receives a broadcast signal or broadcast associated information from an external broadcast management system via a broadcast channel. In one exemplary embodiment, the communication component 11 further includes a near field communication (NFC) module to facilitate short-range communications. For example, the NFC module may be implemented based on a technology such as a radio frequency identification (RFID) technology, an infrared data association (IrDA) technology, an ultra-wideband (UWB) technology, a Bluetooth (BT) technology, and other technologies.

Alternatively or additionally, the wireless charging transmitter 220 includes one wired communication component 11, which makes the wireless charging transmitter 220 have a communication capability. The wireless charging transmitter 220 establishes a wired network connection with the intelligent management device using the wired communication interface in the communication component 11.

The infrared sensor 13 is configured to facilitate the wireless charging transmitter 220 to monitor the charging path between the mobile terminal and the wireless charging transmitter. The infrared sensor 13 makes the wireless charging transmitter 220 have an infrared detection capability. In one exemplary embodiment, as shown in FIG. 1A and FIG. 1B, the wireless charging transmitter 220 monitors the obstacle information on the charging path between the mobile terminal and the wireless charging transmitter via the infrared sensor 13. When the obstacle information indicates that an obstacle exists on the charging path, the wireless charging transmitter 220 reports the obstacle information to the intelligent management device.

The transmitting antenna 14 is configured to facilitate the wireless charging transmitter 220 to transmit the wireless energy wave in the transmitting direction, such that the wireless charging transmitter 220 has a strong directional transmitting capability. Alternatively or additionally, the wireless charging transmitter 220 includes a plurality of transmitting antennas 14, each transmitting antenna 14 pointing to one transmitting direction. In one exemplary embodiment, when the wireless charging transmitter 220 is placed in the middle of the indoor environment, the wireless charging transmitter 220 includes a transmitting antenna 14 with 360 degrees in direction, such that the wireless charging transmitter 220 transmits the wireless energy wave within a range of 360 degrees; in one exemplary embodiment, when the wireless charging transmitter 220 is placed in an orthogonal corner, the wireless charging transmitter 220 includes a transmitting antenna 14 with 90 degrees in direction, such that the wireless charging transmitter 220 transmits the wireless energy wave within a range of 90 degrees. In one exemplary embodiment, the wireless charging transmitter 220 has one transmitting antenna 14, which can be rotated 360 degrees in direction, such that the wireless charging transmitter 220 may adjust the direction of the transmitting antenna 14 according to the transmitting direction. In this embodiment, the number of the transmitting antennas 14 in the wireless charging transmitter 220 is not limited specifically.

Input/output (I/O) interface 12 provides the wireless charging transmitter 220 with a peripheral interface, such as an interface of the infrared sensor and an interface of the transmitting antenna.

Figure 2C:
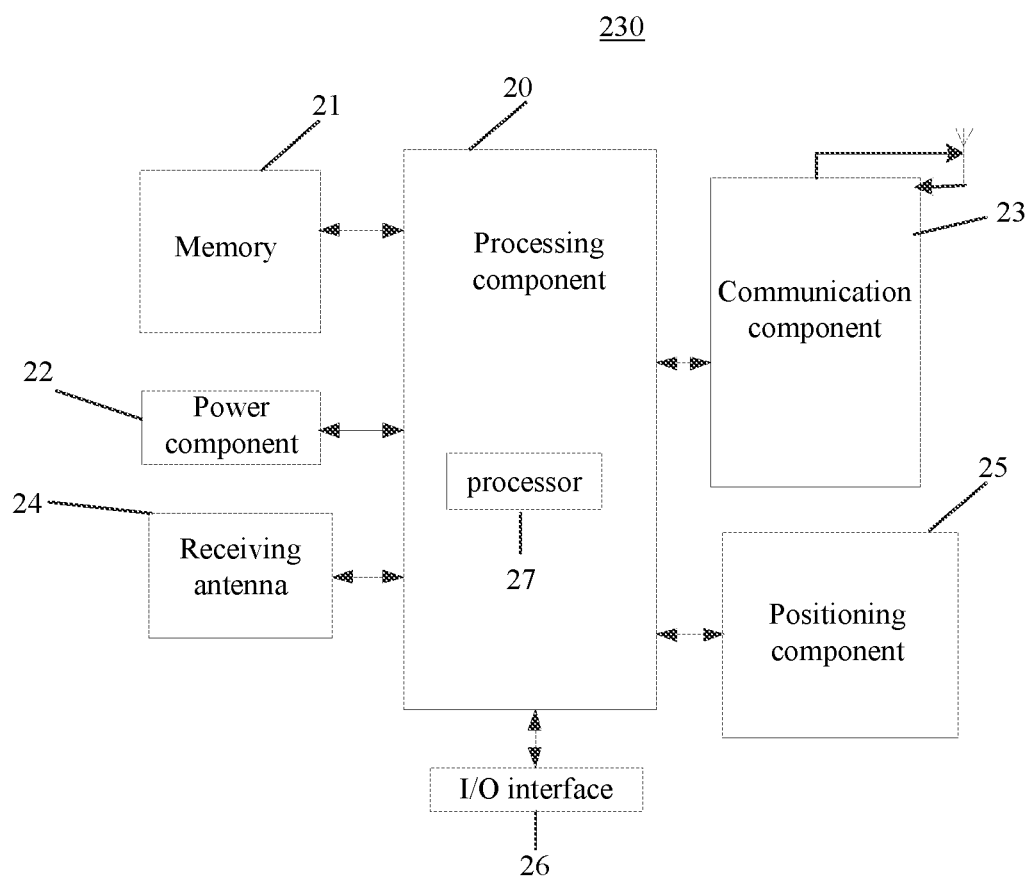
FIG. 2C is a block diagram showing a mobile terminal according to an exemplary embodiment.

FIG. 2C is a block diagram showing a mobile terminal 230 according to an exemplary embodiment. As shown in FIG. 2C, the mobile terminal 230 may include one or more of the following components: a processing component 20, a memory 21, a power component 22, a communication component 23, a receiving antenna 24, a positioning component 25, and an input/output (I/O) interface 26.

The processing component 20 typically controls overall operations of the mobile terminal 230, such as the operations associated with display, data communications, camera operations, and recording operations. The processing component 20 may include one or more processors 27 to execute instructions so as to perform all or part of the steps in the above described methods. Moreover, the processing component 20 may include one or more modules which facilitate the interaction between the processing component 20 and other components. For instance, the processing component 20 may include an image capturing module to facilitate the interaction between the communication component 23 and the processing component 20.

The memory 21 is configured to store various types of data to support the operation of the mobile terminal 230. Examples of such data include instructions for any applications or methods operated on the mobile terminal 230, messages, pictures, videos, etc. The memory 21 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 22 provides power to various components of the mobile terminal 230. The power component 22 may include a power management system, one or more power sources, and any other components associated with the generation, management, and distribution of power in the mobile terminal 230.

The communication component 23 is configured to facilitate wireless communication between the mobile terminal 230 and the intelligent management device. The mobile terminal 230 can access a wireless network based on a communication standard, such as a WIFI network, a 2G network, or a 3G network, or a combination thereof. In one exemplary embodiment, the communication component 23 receives a broadcast signal or broadcast associated information from an external broadcast management system via a broadcast channel. In one exemplary embodiment, the communication component 23 further includes a near field communication (NFC) module to facilitate short-range communications. For example, the NFC module may be implemented based on a technology such as a radio frequency identification (RFID) technology, an infrared data association (IrDA) technology, an ultra-wideband (UWB) technology, a Bluetooth (BT) technology, and other technologies.

The receiving antenna 24 is configured to facilitate the mobile terminal 230 to receive a directional wireless energy wave transmitted by the wireless charging transmitter.

The positioning component 25 is configured to facilitate the mobile terminal 230 to perform a positioning for the first location information of itself, such that the mobile terminal has an indoor positioning capability.

The Input/output (I/O) interface 26 provides the mobile terminal 230 with a peripheral interface, such as an interface of the infrared sensor and an interface of the receiving antenna.

Figure 3:
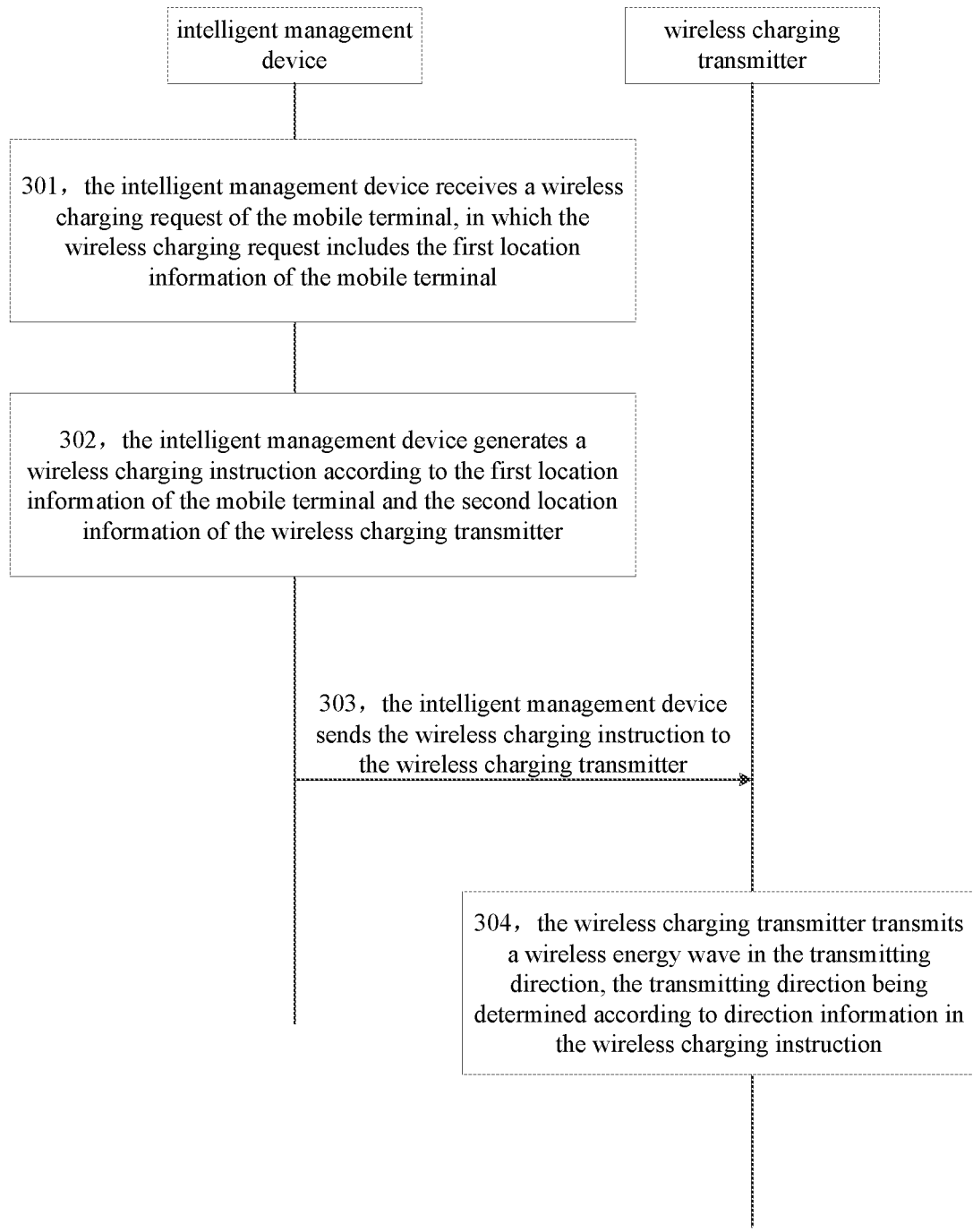
FIG. 3 is a flow chart showing a wireless charging method according to an exemplary embodiment.

FIG. 3 is a flow chart showing a wireless charging method according to an exemplary embodiment. As shown in FIG. 3, the wireless charging method is applied in the system shown in FIG. 1A and includes following steps.

In step 301, the intelligent management device receives a wireless charging request form the mobile terminal, in which the wireless charging request includes the first location information of the mobile terminal.

In step 302, the intelligent management device generates a wireless charging instruction according to the first location information of the mobile terminal and the second location information of the wireless charging transmitter.

The intelligent management device is stored with the second location information of the wireless charging transmitter, and the wireless charging instruction includes the direction information of the mobile terminal relative to the wireless charging transmitter.

In step 303, the intelligent management device sends the wireless charging instruction to the wireless charging transmitter.

In step 304, the wireless charging transmitter transmits a wireless energy wave in the transmitting direction, in which the transmitting direction is determined according to the direction information in the wireless charging instruction.

In conclusion, with the wireless charging method provided by embodiments of the present disclosure, the intelligent management device receives the wireless charging request of the mobile terminal, generates the wireless charging instruction according to the first location information of the mobile terminal and the second location information of the wireless charging transmitter, and sends the wireless charging instruction to the wireless charging transmitter, and the wireless charging transmitter transmits the wireless energy wave in the transmitting direction. Thus, a problem in the related art that the mobile terminal needs a charging cradle to perform the wireless charging and thus can only realize a short distance wireless charging is solved, and an effect of performing a directional, long-range and real-time wireless charging to the mobile terminal is realized by controlling the wireless charging transmitter by the intelligent management device to send the wireless energy wave to the mobile terminal sending the wireless charging request according to the transmitting direction.

Figure 4A:
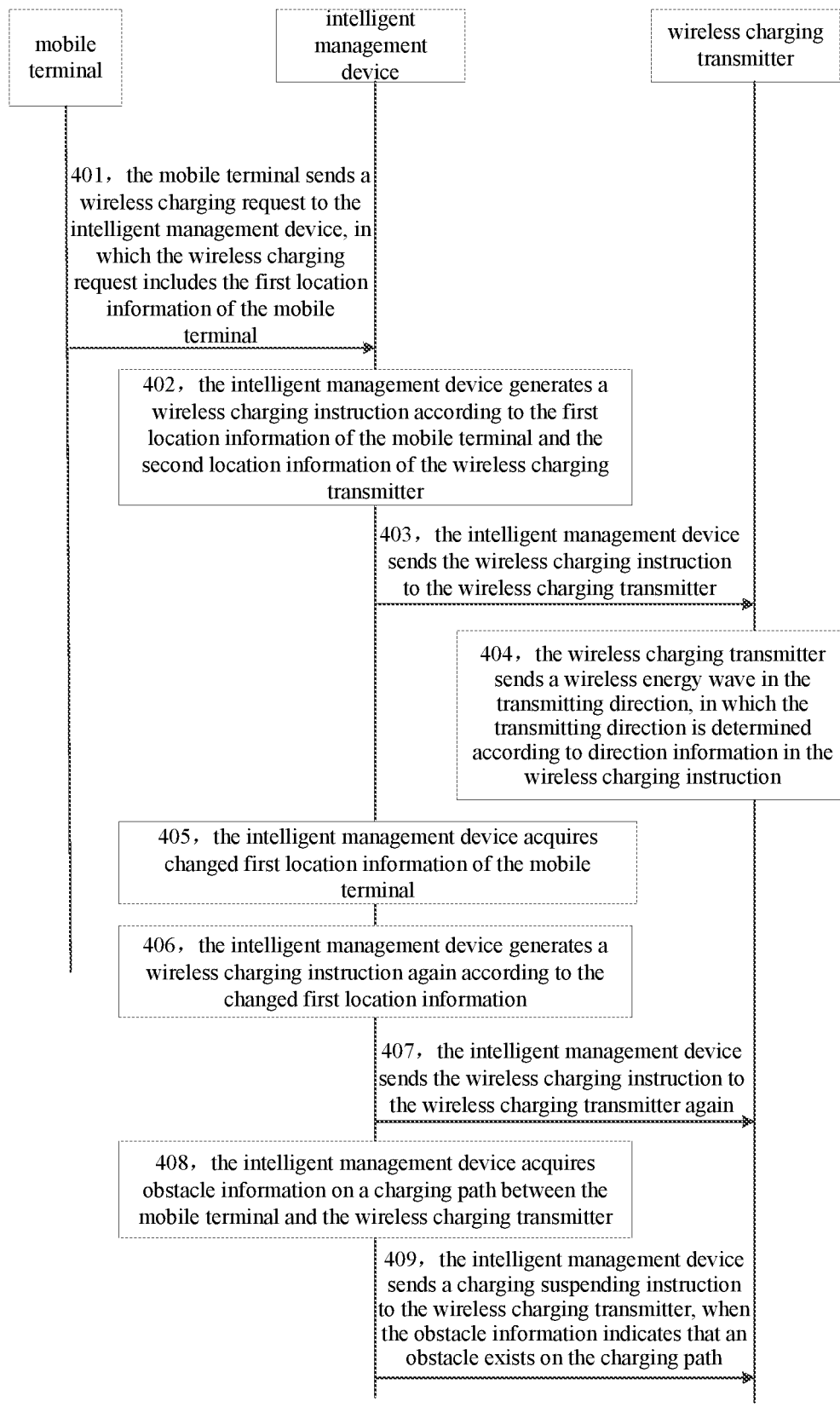
FIG. 4A is a flow chart showing a wireless charging method according to another exemplary embodiment.

FIG. 4A is a flow chart showing a wireless charging method according to another exemplary embodiment. As shown in FIG. 4A, the wireless charging method is applied in the system shown in FIG. 1A and includes the following steps.

In step 401, the mobile terminal sends a wireless charging request to the intelligent management device, in which the wireless charging request includes the first location information of the mobile terminal.

When the currently remaining electric quantity in the mobile terminal is less than the predetermined threshold value, the mobile terminal sends the wireless charging request to the intelligent management device, in which the wireless charging request includes the first location information of the mobile terminal.

Alternatively or additionally, the mobile terminal has a positioning capability, and the first location information of the mobile terminal in the wireless charging request is obtained by the mobile terminal through performing a positioning on itself using the positioning capability.

Alternatively or additionally, the wireless charging request includes an identifier of the mobile terminal, and the intelligent management device determines the first location information of the mobile terminal using the positioning capability according to the identifier of the mobile terminal.

Alternatively or additionally, a map is established inside the intelligent management device, and the first location information of each mobile terminal is marked in the map, and the marked first location information of each mobile terminal is updated every predetermined period.

Accordingly, the intelligent management device receives the wireless charging request sent by the mobile terminal.

In step 402, the intelligent management device generates a wireless charging instruction according to the first location information of the mobile terminal and the second location information of the wireless charging transmitter.

The intelligent management device is stored with the second location information of the wireless charging transmitter, and the wireless charging instruction includes the direction information of the mobile terminal relative to the wireless charging transmitter.

After receiving the wireless charging request from the mobile terminal, the intelligent management device acquires the first location information of the mobile terminal carried in the wireless charging request, and generates the wireless charging instruction according to the acquired first location information of the mobile terminal and the stored second location information of the wireless charging transmitter.

Alternatively or additionally, the wireless charging instruction further includes a charging mode, and the charging mode includes sending a wireless energy wave continuously and sending a wireless energy wave periodically.

Alternatively or additionally, the wireless charging instruction further includes the currently remaining electric quantity of the mobile terminal.

Alternatively or additionally, the intelligent management device may determine the charging mode according to the currently remaining electric quantity of the mobile terminal and the first location information of the mobile terminal.

In step 403, the intelligent management device sends the wireless charging instruction to the wireless charging transmitter.

After generating the wireless charging instruction, the intelligent management device sends the wireless charging instruction to the wireless charging transmitter.

In step 404, the wireless charging transmitter transmits a wireless energy wave in the transmitting direction, in which the transmitting direction is determined according to the direction information in the wireless charging instruction.

After receiving the wireless charging instruction, the wireless charging transmitter acquires the direction information carried in the wireless charging instruction to determine a transmitting direction according to the acquired direction information, and then the wireless charging transmitter adjusts the transmitting direction of the transmitting antenna according to the determined transmitting direction, and transmits a wireless energy wave in the transmitting direction.

Alternatively or additionally, the direction information carried in the wireless charging instruction may be represented in a form of polar coordinates, for example, the direction information carried in the wireless charging instruction shows that the mobile terminal is on the straight line which has an angle of 30 degrees with respect to the polar axis corresponding to the wireless charging transmitter, and the distance between the mobile terminal and the wireless charging transmitter is 5 meters.

Alternatively or additionally, the wireless charging transmitter acquires the charging mode carried in the wireless charging instruction, and sends the wireless energy wave in the transmitting direction continuously or sends the wireless energy wave in the transmitting direction periodically according to the charging mode.

Alternatively or additionally, the wireless energy wave transmitted by the wireless charging transmitter may be an electromagnetic wave, a light beam wave or the like.

In step 405, the intelligent management device acquires changed first location information of the mobile terminal.

The intelligent management device acquires the first location information of the mobile terminal every predetermined period to detect whether the first location information of the mobile terminal acquired this time is same as the first location information of the mobile terminal acquired last time, and if no, the intelligent management device saves the changed first location information of the mobile terminal.

In step 406, the intelligent management device generates a wireless charging instruction again according to the changed first location information.

When the first location information of the mobile terminal changes, the intelligent management device generates a wireless charging instruction again according to the changed first location information and the second location information of the wireless charging transmitter.

Alternatively or additionally, the direction information carried in the wireless charging instruction regenerated changes as the first location information of the mobile terminal changes.

Alternatively or additionally, the charging mode in the wireless charging instruction may also change.

In step 407, the intelligent management device sends the wireless charging instruction to the wireless charging transmitter again.

The intelligent management device sends the regenerated wireless charging instruction to the wireless charging transmitter.

Alternatively or additionally, when any information carried in wireless charging instruction changes, the intelligent management device sends the wireless charging instruction to the wireless charging transmitter again. For example, if only the direction information in the wireless charging instruction changes, then the intelligent management device sends the wireless charging instruction to the wireless charging transmitter again.

Alternatively or additionally, when a kind of information in the wireless charging instruction changes, the intelligent management device only sends the changed information in the wireless charging instruction to the wireless charging transmitter. For example, if only the direction information in the wireless charging instruction changes, then the intelligent management device only sends the direction information in the wireless charging instruction to the wireless charging transmitter again, while the unchanged information is not sent again.

In step 408, the intelligent management device acquires obstacle information on the charging path between the mobile terminal and the wireless charging transmitter.

In the process of wireless charging, the intelligent management device acquires the obstacle information on the charging path between the mobile terminal and the wireless charging transmitter every predetermined period.

The intelligent management device may acquire the obstacle information on the charging path between the mobile terminal and the wireless charging transmitter every predetermined period in any of following three ways.

In the first way, the intelligent management device acquires the obstacle information on the charging path between the mobile terminal and the wireless charging transmitter via an infrared sensor.

The intelligent management device includes the infrared sensor, and the intelligent management device monitors whether an obstacle exists on the charging path between the mobile terminal and the wireless charging transmitter via the infrared sensor every predetermined period, and if an obstacle exists, then the intelligent management device acquires information of the obstacle on the charging path.

In the second way, the intelligent management device acquires the obstacle information on the charging path between the mobile terminal and the wireless charging transmitter via an image capturing component.

The intelligent management device includes an image capturing component, such as an omni-directional camera. The intelligent management device takes an image via the image capturing component every predetermined period so as to detect whether an obstacle exists on the charging path between the mobile terminal and the wireless charging transmitter. When the taken image indicates that an obstacle exists on the charging path between the mobile terminal and the wireless charging transmitter, the intelligent management device acquires information of the obstacle on the charging path.

In the third way, the intelligent management device receives the obstacle information reported by the wireless charging transmitter, in which the obstacle information is information of the obstacle existing on the charging path between the mobile terminal and the wireless charging transmitter.

The wireless charging transmitter includes an infrared sensor, and the wireless charging transmitter monitors whether an obstacle exists on the charging path between the mobile terminal and the wireless charging transmitter via the infrared sensor every predetermined period, and if the obstacle exists, the wireless charging transmitter acquires the information of the obstacle on the charging path and reports the obstacle information to the intelligent management device. Accordingly, the intelligent management device receives the obstacle information reported by the wireless charging transmitter.

In step 409, the intelligent management device sends a charging suspending instruction to the wireless charging transmitter, tin which he charging suspending instruction is sent when the obstacle information indicates that an obstacle exists on the charging path.

The intelligent management device sends a charging suspending instruction to the wireless charging transmitter when the acquired obstacle information indicates that an obstacle exists on the charging path.

Alternatively or additionally, when the obstacle information acquired again indicates that no obstacle exists on the charging path, or when information indicating that no obstacle exists on the charging path between the mobile terminal and the wireless charging transmitter is acquired, a charging continuing instruction is sent to the wireless charging transmitter, that is, the wireless charging transmitter continues to send the wireless energy wave in the transmitting direction.

Figure 4B:
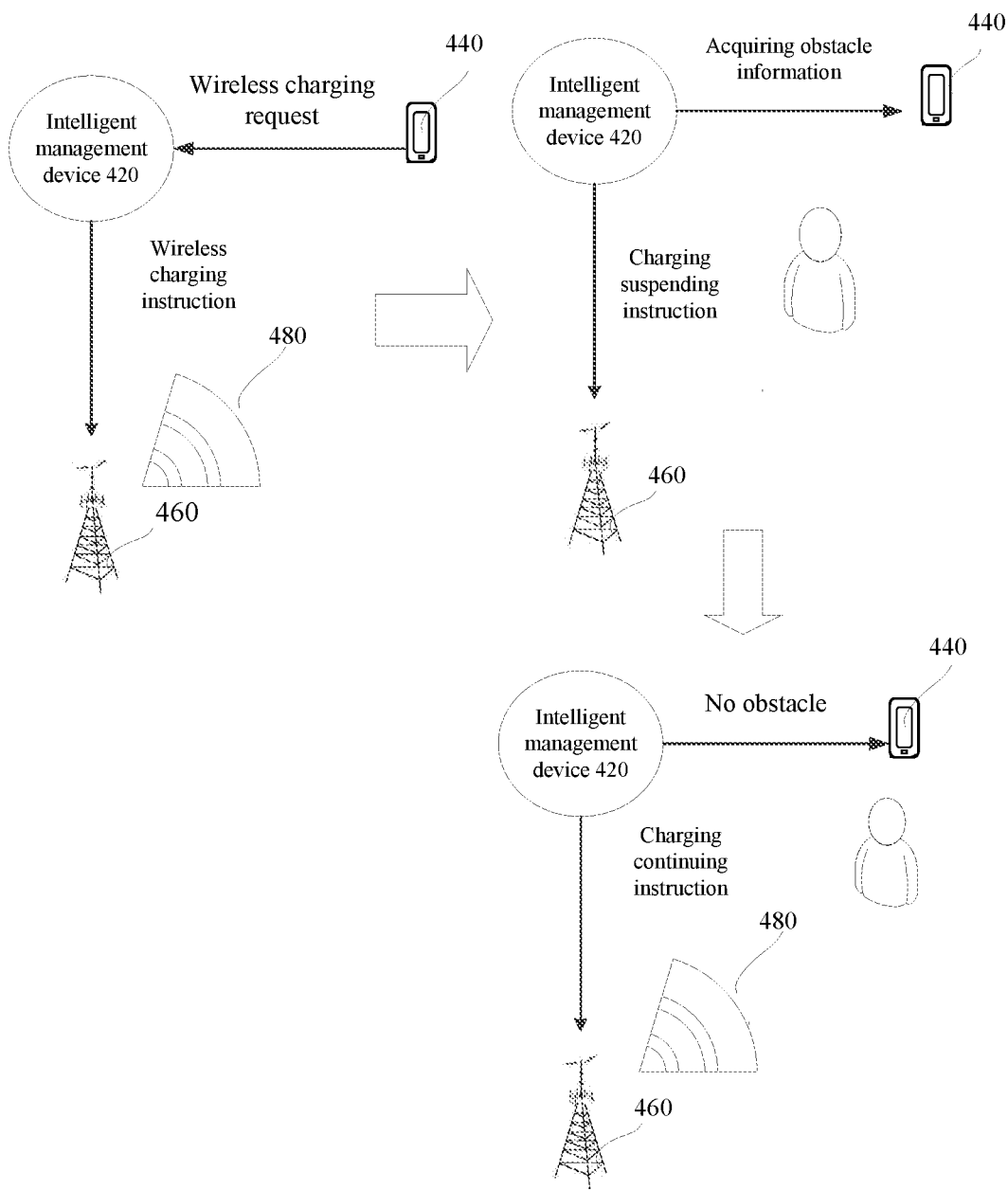
FIG. 4B is a schematic diagram showing a wireless charging system according to an exemplary embodiment.

As shown in FIG. 4B, after receiving the wireless charging request from the mobile terminal 440, the intelligent management device 420 sends the wireless charging instruction to the wireless charging transmitter 460, such that the wireless charging transmitter 460 sends the wireless energy wave 480 in the transmitting direction. When the intelligent management device 420 acquires the obstacle information on the charging path between the mobile terminal 440 and the wireless charging transmitter 460 indicating that an obstacle 450 exists, the intelligent management device 420 sends a charging suspending instruction to the wireless charging transmitter 460, such that the wireless charging transmitter 460 does not send a wireless energy wave 480 in the transmitting direction. When the intelligent management device 420 acquires the obstacle information on the charging path between the mobile terminal 440 and the wireless charging transmitter 460 indicating that no obstacle exists, the intelligent management device 420 sends a charging continuing instruction to the wireless charging transmitter 460, such that the wireless charging transmitter 460 continues to send the wireless energy wave 480 in the transmitting direction.

In conclusion, with the wireless charging method provided by the embodiments of the present disclosure, the intelligent management device receives the wireless charging request of the mobile terminal, generates the wireless charging instruction according to the first location information of the mobile terminal and the second location information of the wireless charging transmitter, and sends the wireless charging instruction to the wireless charging transmitter, such that the wireless charging transmitter transmits the wireless energy wave in the transmitting direction. Thus, a problem in the related art that the mobile terminal needs a charging cradle to perform the wireless charging and thus can only realize a short distance wireless charging is solved, and an effect of performing a directional, long-range and real-time wireless charging to the mobile terminal is realized by controlling the wireless charging transmitter by the intelligent management device to send the wireless energy wave to the mobile terminal sending the wireless charging request according to the transmitting direction.

Moreover, when the intelligent management device acquires the obstacle information on the charging path between the mobile terminal and the wireless charging transmitter, and the obstacle information indicates that an obstacle exists, the intelligent management device sends a charging suspending instruction to the wireless charging transmitter, and thus an effect of performing a real-time wireless charging on the mobile terminal by the intelligent management device is realized, and a problem of causing a wireless charging interruption due to an obstacle is avoided.

Moreover, the intelligent management device acquires the changed first location information of the mobile terminal, generates a wireless charging instruction again according to the changed first location information, and sends the wireless charging instruction to the wireless charging transmitter again. Thus, the intelligent management device can generate a corresponding wireless charging instruction in real time according to the changed first location information of the mobile terminal, thereby increasing the real-time nature of charging the mobile terminal.

It should be noted that, in the embodiment shown in FIG. 4A, the execution sequence of step 405 to step 407 and step 408 to step 409 is not limited specifically. That is, the intelligent management device may acquire the changed first location information of the mobile terminal after acquiring the obstacle information on the charging path between the mobile terminal and the wireless charging transmitter, or before acquiring the obstacle information on the charging path between the mobile terminal and the wireless charging transmitter, and the intelligent management device may send the wireless charging instruction to the wireless charging transmitter again first, and then send a charging suspending instruction to the wireless charging transmitter; or, the intelligent management device may send a charging suspending instruction to the wireless charging transmitter first, and then send the wireless charging instruction to the wireless charging transmitter again. In this embodiment, the sequence of these steps is not limited specifically.

Figure 5A:
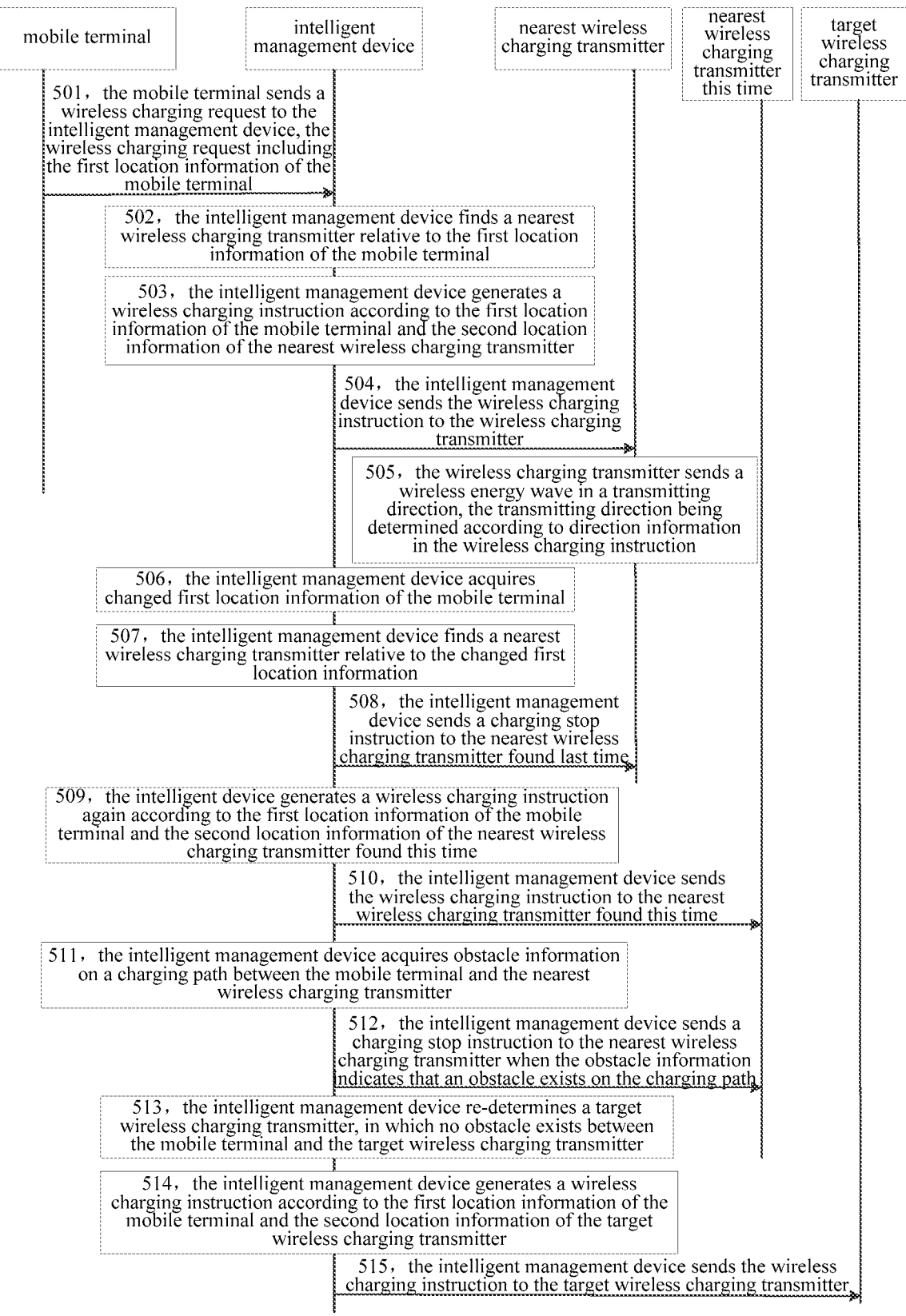
FIG. 5A is a flow chart showing a wireless charging method according to yet another exemplary embodiment.

FIG. 5A is a flow chart showing a wireless charging method according to yet another exemplary embodiment. As shown in FIG. 5A, the wireless charging method is applied in the system shown in FIG. 1B and includes the following steps.

In step 501, the mobile terminal sends a wireless charging request to the intelligent management device, in which the wireless charging request includes the first location information of the mobile terminal.

When the currently remaining electric quantity in the mobile terminal is less than the predetermined threshold value, the mobile terminal sends the wireless charging request to the intelligent management device, in which the wireless charging request includes the first location information of the mobile terminal.

Alternatively or additionally, the mobile terminal has a positioning capability, and the first location information of the mobile terminal in the wireless charging request is obtained by the mobile terminal through performing a positioning on itself using the positioning capability.

Alternatively or additionally, the wireless charging request includes an identifier of the mobile terminal, and the intelligent management device determines the first location information of the mobile terminal using the positioning capability according to the identifier of the mobile terminal.

Alternatively or additionally, a map is established inside the intelligent management device, and the first location information of each mobile terminal is marked in the map, and the marked first location information of each mobile terminal is updated every predetermined periods.

Accordingly, the intelligent management device receives the wireless charging request sent by the mobile terminal.

In step 502, the intelligent management device finds a nearest wireless charging transmitter relative to the first location information of the mobile terminal.

The intelligent management device is stored with the second location information of each wireless charging transmitter.

After receiving the wireless charging request from the mobile terminal, the intelligent management device acquires the first location information of the mobile terminal carried in the wireless charging request, and finds the nearest wireless charging transmitter relative to the first location information of the mobile terminal according to the acquired first location information of the mobile terminal.

Figure 5B:
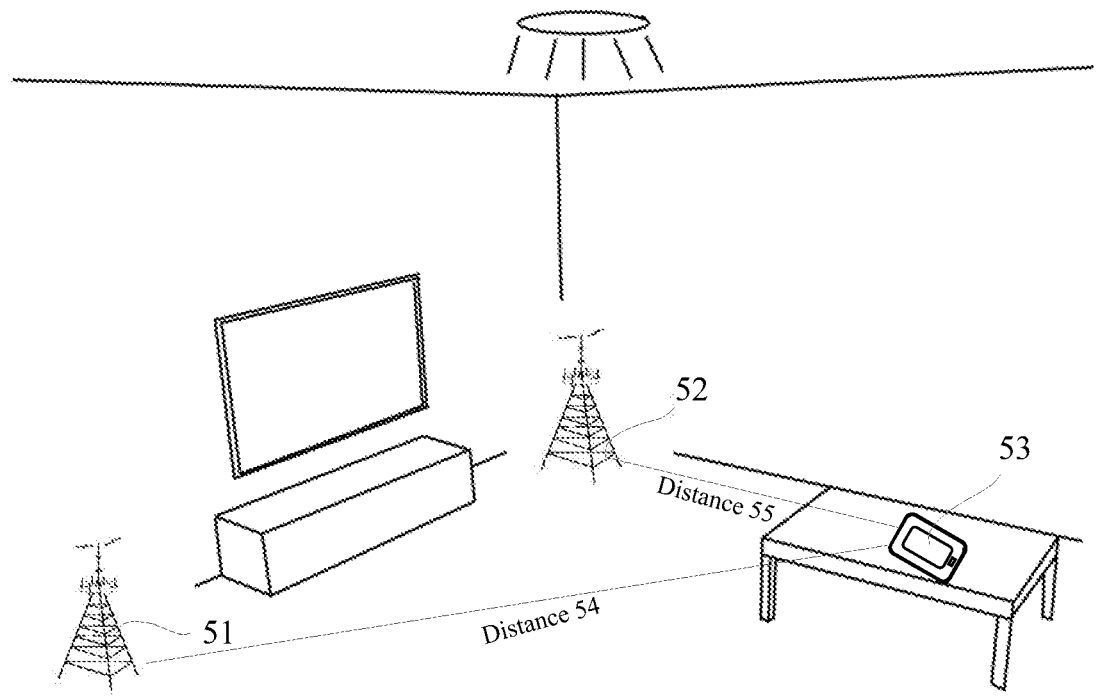
FIG. 5B is a schematic diagram showing finding a nearest wireless charging transmitter to the mobile terminal according to an exemplary embodiment.

For example, as shown in FIG. 5B, assume that the system shown in FIG. 1B includes a wireless charging transmitter 51 and a wireless charging transmitter 52, the intelligent management device acquires the first location information of the mobile terminal 53 according to wireless charging request, and determines the nearest wireless charging transmitter by comparing the distance 54 between the wireless charging transmitter 51 and the mobile terminal 53 with the distance 55 between the wireless charging transmitter 52 and the mobile terminal 53. In FIG. 5B, since the distance 54 is greater than the distance 55, the intelligent management device determines that the nearest wireless charging transmitter relative to the first location information of the mobile terminal 53 is the wireless charging transmitter 52.

In step 503, the intelligent management device generates a wireless charging instruction according to the first location information of the mobile terminal and the second location information of the nearest wireless charging transmitter.

The wireless charging instruction includes direction information of the mobile terminal relative to the wireless charging transmitter.

After finding the nearest wireless charging transmitter relative to the first location information of the mobile terminal, the intelligent management device acquires the first location information of the mobile terminal carried in the wireless charging request, and generates a wireless charging instruction according to the acquired first location information of the mobile terminal and the stored second location information of the nearest wireless charging transmitter.

Alternatively or additionally, the wireless charging instruction further includes a charging mode, in which the charging mode includes sending a wireless energy wave continuously and sending a wireless energy wave periodically.

Alternatively or additionally, the wireless charging instruction further includes the currently remaining electric quantity of the mobile terminal.

Alternatively or additionally, the intelligent management device may determine the charging mode according to the currently remaining electric quantity of the mobile terminal and the first location information of the mobile terminal.

In step 504, the intelligent management device sends the wireless charging instruction to the wireless charging transmitter.

After generating the wireless charging instruction, the intelligent management device sends the wireless charging instruction to the wireless charging transmitter.

In step 505, the wireless charging transmitter transmits a wireless energy wave in the transmitting direction, in which the transmitting direction is determined according to the direction information in the wireless charging instruction.

After receiving the wireless charging instruction, the wireless charging transmitter acquires the direction information carried in the wireless charging instruction to determine the transmitting direction according to the acquired direction information, and then the wireless charging generator adjusts the transmitting direction of the transmitting antenna according to the determined transmitting direction, and transmits the wireless energy wave in the transmitting direction.

Alternatively or additionally, the direction information carried in the wireless charging instruction may be represented in a form of polar coordinates, for example, the direction information carried in the wireless charging instruction shows that the mobile terminal is on the straight line which has an angle of 30 degrees with respect to the polar axis corresponding to the wireless charging transmitter, and the distance between the mobile terminal and the nearest wireless charging transmitter is 3 meters.

Alternatively or additionally, the wireless charging transmitter acquires the charging mode carried in the wireless charging instruction and sends the wireless energy wave in the transmitting direction continuously or sends a wireless energy wave in the transmitting direction periodically according to the charging mode.

Alternatively or additionally, the wireless energy wave transmitted by the wireless charging transmitter may be an electromagnetic wave, a light beam wave or the like.

In step 506, the intelligent management device acquires changed first location information of the mobile terminal.

The intelligent management device acquires the first location information of the mobile terminal every predetermined period to detect whether the first location information of the mobile terminal acquired this time is same as the first location information of the mobile terminal acquired last time, and if no, the intelligent management device saves the changed first location information of the mobile terminal.

In step 507, the intelligent management device finds the nearest wireless charging transmitter relative to the changed first location information.

The intelligent management device finds the nearest wireless charging transmitter relative to the changed first location information according to the changed first location information of the mobile terminal and the stored second location information of each wireless charging transmitter. The specific process is similar to step 502, and reference may be made to step 502.

In step 508, the intelligent management device sends a charging stop instruction to the nearest wireless charging transmitter found last time.

The charging stop instruction is sent when the nearest wireless charging transmitter found this time is not the same as the nearest wireless charging transmitter found last time.

The intelligent management device compares the nearest wireless charging transmitter found this time according to the changed first location information of the mobile terminal with the nearest wireless charging transmitter found last time, and when the nearest wireless charging transmitter found this time is not same as the nearest wireless charging transmitter found last time, the intelligent management device sends a charging stop instruction to the nearest wireless charging transmitter found last time.

In step 509, the intelligent management device generates a wireless charging instruction again according to the first location information of the mobile terminal and the second location information of the nearest wireless charging transmitter found this time.

When the first location information of the mobile terminal changes, the intelligent management device generates a wireless charging instruction again according to the changed first location information and the second location information of the nearest wireless charging transmitter found this time.

Alternatively or additionally, the direction information carried in the wireless charging instruction generated again changes as the first location information of the mobile terminal changes.

Alternatively or additionally, the direction information carried in the wireless charging instruction generated again changes with the second location information of the nearest wireless charging transmitter found this time.

Alternatively or additionally, the charging mode in the wireless charging instruction may also change.

In step 510, the intelligent management device sends the wireless charging instruction to the nearest wireless charging transmitter found this time.

The intelligent management device sends the newly generated wireless charging instruction to the nearest wireless charging transmitter found this time.

In step 511, the intelligent management device acquires the obstacle information on the charging path between mobile terminal and the nearest wireless charging transmitter.

In the process of wireless charging, the intelligent management device acquires the obstacle information on the charging path between the mobile terminal and the nearest wireless charging transmitter every predetermined period.

The intelligent management device may acquire the obstacle information on the charging path between the mobile terminal and the nearest wireless charging transmitter every predetermined period in any of following three ways.

In the first way, the intelligent management device acquires the obstacle information on the charging path between mobile terminal and the nearest wireless charging transmitter via an infrared sensor.

The intelligent management device includes an infrared sensor, and the intelligent management device monitors whether an obstacle exists on the charging path between the mobile terminal and the nearest wireless charging transmitter via the infrared sensor every predetermined period, and if an obstacle exists, the intelligent management device acquires information of the obstacle on the charging path.

In the second way, the intelligent management device acquires the obstacle information on the charging path between the mobile terminal and the nearest wireless charging transmitter via an image capturing component.

The intelligent management device includes an image capturing component, such as an omni-directional camera. The intelligent management device takes an image via the image capturing component every predetermined period to detect whether an obstacle exists on the charging path between the mobile terminal and the nearest wireless charging transmitter. If the taken image indicates that an obstacle exists on the charging path between the mobile terminal and the nearest wireless charging transmitter, the intelligent management device acquires information of the obstacle on the charging path.

In the third way, the intelligent management device receives the obstacle information reported by the nearest wireless charging transmitter, in which the obstacle information is information of the obstacle existing on the charging path between the mobile terminal and the nearest wireless charging transmitter.

The nearest wireless charging transmitter includes an infrared sensor, the nearest wireless charging transmitter monitors whether an obstacle exists on the charging path between the mobile terminal and the nearest wireless charging transmitter via the infrared sensor every predetermined period, and if an obstacle exists, the nearest wireless charging transmitter acquires the information of the obstacle on the charging path and reports the obstacle information to the intelligent management device. Accordingly, the intelligent management device receives the obstacle information reported by the nearest wireless charging transmitter.

In step 512, the intelligent management device sends a charging suspending instruction to the nearest wireless charging transmitter, in which the charging suspending instruction is sent when the obstacle information indicates that an obstacle exists on the charging path.

The intelligent management device sends a charging suspending instruction to the nearest wireless charging transmitter when the acquired obstacle information indicates that an obstacle exists on the charging path.

In step 513, the intelligent management device re-determines a target wireless charging transmitter, in which no obstacle exists between the wireless charging transmitter and the mobile terminal.

After sending the charging suspending instruction to the nearest wireless charging transmitter, the intelligent management device re-determines the target wireless charging transmitter from the remaining wireless charging transmitters, in which there is no obstacle existing between the target wireless charging transmitter and the mobile terminal.

Figure 5C:
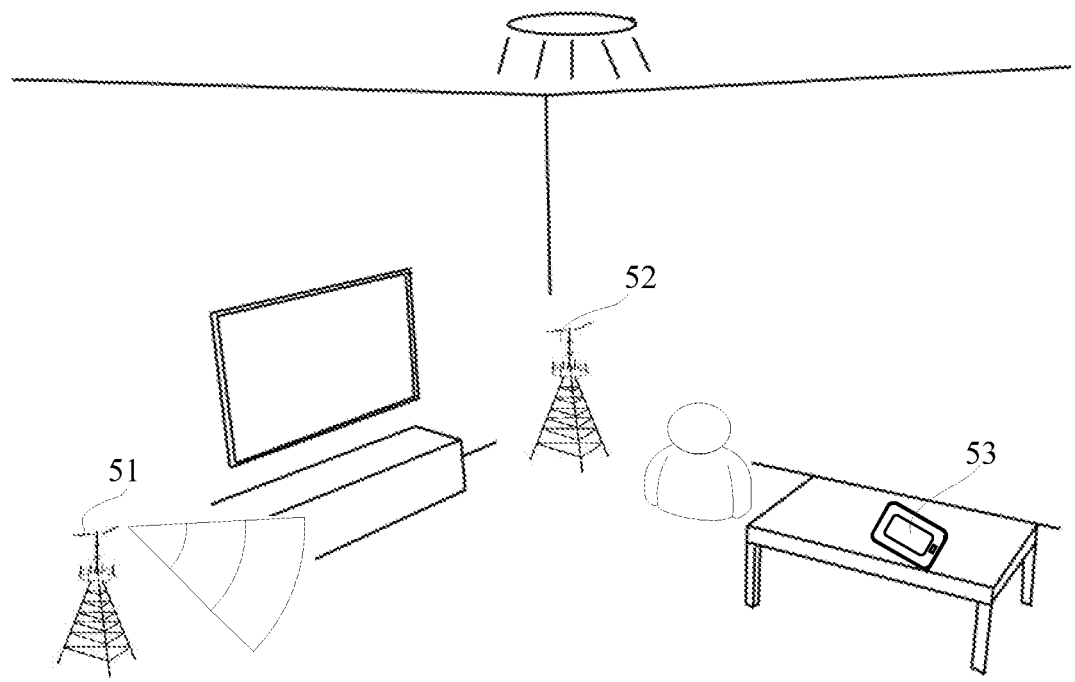
FIG. 5C is a schematic diagram showing determining a target wireless charging transmitter according to an exemplary embodiment.

For example, as shown in FIG. 5C, based on the example shown in FIG. 5B, an obstacle exists between the nearest wireless charging transmitter 52 and the mobile terminal 53, while there is no obstacle existing between the wireless charging transmitter 51 and the mobile terminal, and thus the intelligent management device determines the wireless charging transmitter 51 as the target wireless charging transmitter.

In step 514, the intelligent management device generates a wireless charging instruction according to the first location information of the mobile terminal and the second location information of the target wireless charging transmitter.

After determining the target wireless charging transmitter, the intelligent management device generates a wireless charging instruction again according to the first location information of the mobile terminal and the second location information of the target wireless charging transmitter.

The process of generating a wireless charging instruction again is similar to generating a wireless charging instruction the first time, and with respect to specific details, reference may be made to step 503.

In step 515, the intelligent management device sends he wireless charging instruction to the target wireless charging transmitter.

The intelligent management device sends the newly generated wireless charging instruction to the target wireless charging transmitter, such that the target wireless charging transmitter determines the transmitting information according to the direction information in the newly generated wireless charging instruction, and transmits a wireless energy wave according to the transmitting information.

Figure 5D:
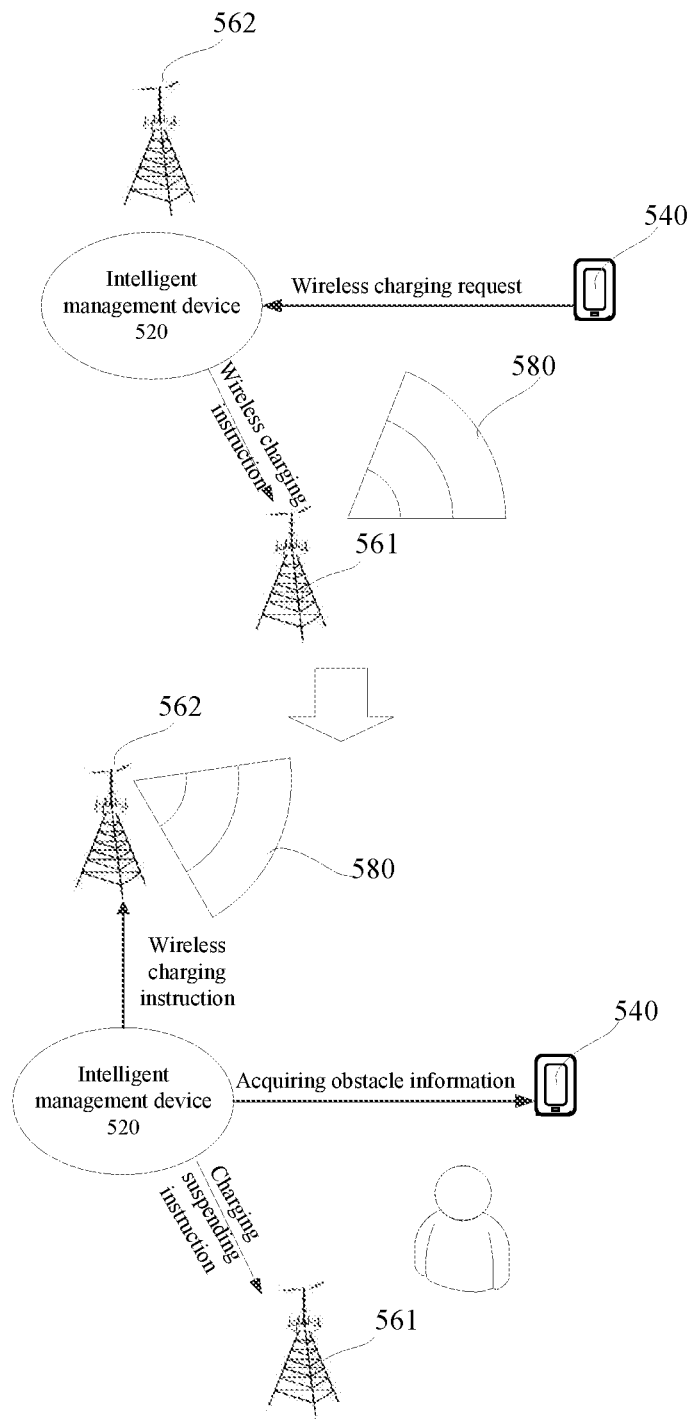
FIG. 5D is a schematic diagram showing a wireless charging system according to another exemplary embodiment.

As shown in FIG. 5D, after receiving the wireless charging request of the mobile terminal 540, the intelligent management device 520 finds the nearest wireless charging transmitter 561 relative to the first location information of the mobile terminal 540, and the nearest wireless charging transmitter 561 sends a wireless energy wave 580 in the transmitting direction; when the intelligent management device 520 acquires the obstacle information on the charging path between the mobile terminal 540 and the nearest wireless charging transmitter 561 indicating that an obstacle exists, the intelligent management device 520 sends a charging suspending instruction to the nearest wireless charging transmitter 561, such that the nearest wireless charging transmitter 561 does not send the wireless energy wave 580 in the transmitting direction; the intelligent management device 520 re-determines a target wireless charging transmitter 562, and the intelligent management device 520 sends a wireless charging instruction to the target wireless charging transmitter 562, such that the target wireless charging transmitter 562 sends the wireless energy wave 580 in the transmitting direction.

In conclusion, with the wireless charging method provided by embodiments of the present disclosure, the intelligent management device receives the wireless charging request of the mobile terminal, generates the wireless charging instruction according to the first location information of the mobile terminal and the second location information of the wireless charging transmitter, and sends the wireless charging instruction to the wireless charging transmitter, such that the wireless charging transmitter transmits the wireless energy wave in the transmitting direction. Thus, a problem in the related art that the mobile terminal needs a charging cradle to perform the wireless charging and thus can only realize a short distance wireless charging is solved, and an effect of performing a directional, long-range and real-time wireless charging to the mobile terminal is realized by controlling the wireless charging transmitter by the intelligent management device to send the wireless energy wave to the mobile terminal sending the wireless charging request according to the transmitting direction.

Moreover, when the intelligent management device acquires the obstacle information on the charging path between the mobile terminal and the nearest wireless charging transmitter, and the obstacle information indicates that an obstacle exists, the intelligent management device sends the charging suspending instruction to the nearest wireless charging transmitter, and the intelligent management device re-determines the target wireless charging transmitter and sends the wireless charging instruction to the target wireless charging transmitter. Thus, when an obstacle exists on the charging path between the mobile terminal and the nearest wireless charging transmitter, the intelligent management device can realize performing the wireless charging for the mobile terminal via the target wireless charging transmitter, thereby avoiding a problem of causing a wireless charging interruption due to the obstacle.

Moreover, the intelligent management device acquires the changed first location information of the mobile terminal, sends a charging stop instruction to the nearest wireless charging transmitter found last time, generates a wireless charging instruction again according to the changed first location information and the second location information of the nearest wireless charging transmitter found this time, and sends the wireless charging instruction to the nearest wireless charging transmitter found this time. Thus, the intelligent management device can generate a corresponding wireless charging instruction in real time according to the changed first location information of the mobile terminal and the second location information of the updated nearest wireless charging transmitter, thereby increasing the real-time nature of charging the mobile terminal.

It should be noted that, in the embodiment shown in FIG. 5A, the execution sequence of step 506 to step 510 and step 511 to step 515 is not limited specifically. That is, the intelligent management device may acquire the changed first location information of the mobile terminal after the intelligent management device acquires the obstacle information on the charging path between the mobile terminal and the wireless charging transmitter, or before the intelligent management device acquires the obstacle information on the charging path between the mobile terminal and the wireless charging transmitter. In this embodiment. The sequence of these two steps is not limited specifically.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the present disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A wireless charging system, comprising:
an intelligent management device and
at least two wireless charging transmitters, wherein the intelligent management device stores charging location information of each wireless charging transmitter;
the intelligent management device is configured to:
receive a wireless charging request from a mobile terminal, in which the wireless charging request comprises first location information of the mobile terminal;
identify a nearest wireless charging transmitter relative to the first location information of the mobile terminal;
generate a wireless charging instruction according to the first location information of the mobile terminal and the charging location information of the nearest wireless charging transmitter, wherein the wireless charging instruction comprises direction information of the mobile terminal relative to the nearest wireless charging transmitter; and send the wireless charging instruction to the nearest wireless charging transmitter;

the intelligent management device is further configured to:

acquire changed first location information of the mobile terminal during the wireless charging;

identify a nearest wireless charging transmitter relative to the changed first location information;

send a charging stop instruction to the nearest wireless charging transmitter found last time, when the nearest wireless charging transmitter found this time is not same as the nearest wireless charging transmitter found last time; and further configured to generate a wireless charging instruction again according to the first location information of the mobile terminal and the charging location information of the nearest wireless charging transmitter found this time;

send the wireless charging instruction to the nearest wireless charging transmitter found this time; and the nearest wireless charging transmitter is configured to:

receive the wireless charging instruction;

determine a transmitting direction according to the direction information in the wireless charging instruction; and transmit a wireless energy wave in the transmitting direction.

2. The system according to claim 1, wherein the intelligent management device is configured to: acquire obstacle information on a charging path between the mobile terminal and the wireless charging transmitter during wireless charging; send a charging suspending instruction to the wireless charging transmitter when the obstacle information indicates that an obstacle exists on the charging path.

3. The system according to claim 1, wherein the intelligent management device is configured to: acquire changed first location information of the mobile terminal during wireless charging; generate a wireless charging instruction again according to the changed first location information; and send the wireless charging instruction to the wireless charging transmitter again.

4. The system according to claim 1, wherein the intelligent management device is configured to: acquire obstacle information on a charging path between the mobile terminal and the nearest wireless charging transmitter during wireless charging; send a charging suspending instruction to the nearest wireless charging transmitter, when the obstacle information indicates that an obstacle exists on the charging path; and wherein the intelligent management device is further configured to: re-determine a target wireless charging transmitter, in which there is no obstacle existing between the target wireless charging transmitter and the mobile terminal; generate the wireless charging instruction according to the first location information of the mobile terminal and the charging location information of the target wireless charging transmitter; send the wireless charging instruction to the target wireless charging transmitter.

5. The system according to claim 2, wherein the intelligent management device is configured to acquire the obstacle information on the charging path via at least one of the following: an infrared sensor, an image capturing component, and the wireless charging transmitter, wherein the obstacle information indicate that the obstacle exists on the charging path.

6. The system according to claim 2, wherein the wireless charging transmitter is configured to acquire the obstacle information on the charging path via an infrared sensor; and wherein the wireless charging transmitter is further configured to report the obstacle information to the intelligent management device.

7. The system according to claim 1, wherein the wireless charging instruction further comprises a charging mode; and wherein the charging mode comprises one of: sending the wireless energy wave continuously and sending the wireless energy wave periodically.

8. A method for wireless charging, comprising:

receiving, by an intelligent management device, a wireless charging request from a mobile terminal, wherein the wireless charging request comprises first location information of the mobile terminal, there are at least two wireless charging transmitters communicating with the intelligent management device, the intelligent management device stores the second location information of each wireless charging transmitter;

identifying a nearest wireless charging transmitter relative to the first location information of the mobile terminal by the intelligent management device;

generating, by the intelligent management device, a wireless charging instruction according to the first location information of the mobile terminal and second location information of the nearest wireless charging transmitter, wherein the wireless charging instruction comprises direction information of the mobile terminal relative to the nearest wireless charging transmitter;

sending, by the intelligent management device, the wireless charging instruction to the nearest wireless charging transmitter;

acquiring changed first location information of the mobile terminal by the intelligent management device;

identifying a nearest wireless charging transmitter according to the changed first location information by the intelligent management device;

sending a charging stop instruction to the nearest wireless charging transmitter found last time by the intelligent management device, in which the charging stop instruction is sent when the nearest wireless charging transmitter found this time is not same as the nearest wireless charging transmitter found last time;

generating a wireless charging instruction again according to the first location information of the mobile terminal and the second location information of the nearest wireless charging transmitter found this time by the intelligent management device; and sending the wireless charging instruction to the nearest wireless charging transmitter found this time by the intelligent management device;

transmitting a wireless energy wave in the transmitting direction by the nearest wireless charging transmitter, wherein the transmitting direction is determined according to the direction information in the wireless charging instruction.

9. The method according to claim 8, further comprising:

acquiring obstacle information on a charging path between the mobile terminal and the wireless charging transmitter by the intelligent management device; and sending a charging suspending instruction to the wireless charging transmitter by the intelligent management device, in which the charging suspending instruction is sent when the obstacle information indicates that an obstacle exists on the charging path.

10. The method according to claim 8, further comprising:
acquiring changed first location information of the mobile terminal by the intelligent management device; and
generating a wireless charging instruction again by the intelligent management device according to the changed first location information, and sending the wireless charging instruction to the wireless charging transmitter again by the intelligent management device.

11. The method according to claim 9, wherein acquiring obstacle information on a charging path between the mobile terminal and the wireless charging transmitter by the intelligent management device comprises:
acquiring, by the intelligent management device, the obstacle information on the charging path between the mobile terminal and the wireless charging transmitter via at least one of the following: an infrared sensor, an image capturing component, and the wireless charging transmitter, wherein the obstacle information indicates that the obstacle exists on the charging path between the mobile terminal and the wireless charging transmitter.

12. The method according to claim 11, wherein, receiving by the intelligent management device the obstacle information reported by the wireless charging transmitter comprises:
acquiring by the wireless charging transmitter the obstacle information on the charging path via an infrared sensor;
reporting the obstacle information to the intelligent management device by the wireless charging transmitter; and
receiving the obstacle information reported by the wireless charging transmitter by the intelligent management device.

13. The method according to claim 8, further comprising:
acquiring the obstacle information on the charging path between the mobile terminal and the nearest wireless charging transmitter by the intelligent management device;
sending a charging suspending instruction to the nearest wireless charging transmitter by the intelligent management device, in which the charging suspending instruction is sent when the obstacle information indicates that an obstacle exists on the charging path;
re-determining a target wireless charging transmitter by the intelligent management device, in which there is no obstacle between the target wireless charging transmitter and the mobile terminal;
generating the wireless charging instruction according to the first location information of the mobile terminal and the second location information of the target wireless charging transmitter by the intelligent management device; and
sending the wireless charging instruction to the target wireless charging transmitter by the intelligent management device.

14. The method according to claim 13, wherein, acquiring the obstacle information on the charging path between the mobile terminal and the nearest wireless charging transmitter by the intelligent management device comprises:
acquiring by the intelligent management device the obstacle information on the charging path between the mobile terminal and the nearest wireless charging transmitter via at least one of the following: an infrared sensor, an image capturing component, and the intelligent management device, where in the obstacle information indicates that the obstacle exists on the charging path between the mobile terminal and the nearest wireless charging transmitter.

15. The method according to the claim 14, wherein receiving the obstacle information reported by the nearest wireless charging transmitter by the intelligent management device comprises:
acquiring by the nearest wireless charging transmitter the obstacle information on the charging path via an infrared sensor;
reporting the obstacle information to the intelligent management device by the nearest wireless charging transmitter; and
receiving the obstacle information reported by the nearest wireless charging transmitter by the intelligent management device.

16. The method according to claim 8, wherein the wireless charging instruction further comprises a charging mode; and
wherein the charging mode comprises one of: sending the wireless energy wave continuously and sending the wireless energy wave periodically.

17. A wireless charging system, comprising:
an intelligent management device and a wireless charging transmitter, wherein the intelligent management device stores charging location information of the wireless charging transmitter;
the intelligent management device is configured to:
receive a wireless charging request from a mobile terminal, in which the wireless charging request comprises first location information of the mobile terminal;
generate a wireless charging instruction according to the first location information of the mobile terminal and the charging location information of the wireless charging transmitter, wherein the wireless charging instruction comprises direction information of the mobile terminal relative to the wireless charging transmitter; and
send the wireless charging instruction to the wireless charging transmitter, wherein the mobile terminal has an indoor positioning capability, and the first location information of the mobile terminal in the wireless charging request is obtained by the mobile terminal through performing a positioning on itself using the indoor positioning capability;
the intelligent management device is further configured to:
acquire changed first location information of the mobile terminal during the wireless charging;
identify a nearest wireless charging transmitter relative to the changed first location information;
send a charging stop instruction to the nearest wireless charging transmitter found last time, when the nearest wireless charging transmitter found this time is not same as the nearest wireless charging transmitter found last time; and
further configured to generate a wireless charging instruction again according to the first location information of the mobile terminal and the charging location information of the nearest wireless charging transmitter found this time;
send the wireless charging instruction to the nearest wireless charging transmitter found this time; and
the wireless charging transmitter is configured to:
receive the wireless charging instruction;

determine a transmitting direction according to the direction information in the wireless charging instruction; and transmit a wireless energy wave in the transmitting direction.

* * * * *